(12) United States Patent
Demtroder et al.

(10) Patent No.: US 7,832,980 B2
(45) Date of Patent: Nov. 16, 2010

(54) METHOD AND SYSTEM FOR MONITORING FLUID LEVELS IN WIND TURBINE COMPONENT SYSTEMS

(75) Inventors: Jens Demtroder, Ronde (DK); Steen Lund, Grena (DK); Lars Skifter, Randers (DK)

(73) Assignee: Vestas Wind Systems A/S (DK)

( * ) Notice: Subject to any disclaimer, the term of this patent is extended or adjusted under 35 U.S.C. 154(b) by 234 days.

(21) Appl. No.: 12/144,324

(22) Filed: Jun. 23, 2008

(65) Prior Publication Data

US 2009/0081026 A1 Mar. 26, 2009

Related U.S. Application Data

(63) Continuation of application No. PCT/DK2005/000827, filed on Dec. 23, 2005.

(51) Int. Cl.
*F03D 11/00* (2006.01)
(52) U.S. Cl. .......................................... 415/118; 73/292
(58) Field of Classification Search ................... 416/61; 415/118
See application file for complete search history.

(56) References Cited

U.S. PATENT DOCUMENTS

| 5,487,300 | A | 1/1996 | Brackett et al. |
| 2002/0029097 | A1* | 3/2002 | Pionzio et al. ............ 700/286 |

FOREIGN PATENT DOCUMENTS

| EP | 0 589 507 A2 | 3/1994 |
| WO | 00/55583 A1 | 9/2000 |
| WO | WO 00/55583 A1 * | 9/2000 |

OTHER PUBLICATIONS

International Search Report, Sep. 27, 2006, 3 pages.
International Preliminary Report on Patentability, Apr. 7, 2008, 5 pages.
* cited by examiner

*Primary Examiner*—Richard Edgar
(74) *Attorney, Agent, or Firm*—St. Onge Steward Johnston & Reens LLC

(57) ABSTRACT

A wind turbine comprising a system for monitoring at least one wind turbine component including a closed fluid circulating system with a fluid reservoir. The monitoring system comprises establishing a level value of the fluid systems reservoir, and establishing at least one environmental value of the fluid systems reservoir or the surroundings of the system. The level value and the at least one environmental value contributing to defining the fluid systems functionality, and the monitoring system further comprises establishing a monitoring value on the basis of the level value and the at least one environmental value.

41 Claims, 8 Drawing Sheets

METHOD AND SYSTEM FOR MONITORING FLUID LEVELS IN WIND TURBINE COMPONENT SYSTEMS

CROSS-REFERENCE TO RELATED APPLICATIONS

The present application is a continuation of pending International patent application PCT/DK2005/000827, filed Dec. 23, 2005, the content of which is incorporated herein by reference.

FIELD OF THE INVENTION

The invention relates to a wind turbine comprising a system for monitoring at least one wind turbine component including a closed fluid circulating system with a fluid reservoir, a method for monitoring at least one wind turbine component including a closed fluid circulating system with a fluid reservoir and a system for monitoring a mechanical and/or electrical component.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

In order for a specific fluid in a closed fluid circulating system to function properly, there has to be a certain amount of the fluid in the system. Monitoring fluid levels in mechanical systems such as the cooling fluid level in cooling systems or the oil level in hydraulic and lubrication systems is therefore a very well known method of monitoring the fluids functionality.

For instance is it well known to monitor the oil level in the oil sump of a wind turbine gearbox by means of a floater, which triggers an electrical contact, when the floater position is above or below a certain level.

Gears churning through the sump, vibrations and other factors stirring up the oil, makes it necessary to filter out short-term fluctuations of the oil level. This is normally done by installing the floater in bypass vessels, where the fluid level communicates with the reservoir through nozzles, which, because of the relative small holes in these nozzles, dampens the fluctuations.

But the viscosity of the oil increases when its temperature drops, and if the oil becomes too thick, the communications between the oil levels in the reservoir and the vessels is interrupted or the measurements becomes so defective that the measurements are useless.

Furthermore, the factors stirring up the oil also can enable that a large amount of air is entrained in the oil, making the floater heavier that the oil and thereby submerging it, or simply enlarging the oils volume. Both scenarios produce mal-readings, which in worst case could lead to a breakdown of the gearbox.

An object of the invention is therefore to provide for a technique for monitoring the fluids functionality in a closed fluid circulating system with a reservoir.

Especially it is an object of the invention to provide a reliable and cost-efficient technique for monitoring the fluids functionality in a closed fluid circulating system with a reservoir in a wind turbine.

SUMMARY OF THE INVENTION

The invention provides for a wind turbine comprising a system for monitoring at least one wind turbine component including a closed fluid circulating system with a fluid reservoir. The monitoring system comprises, means for establishing a level value of the fluid systems reservoir, and means for establishing at least one environmental value of the fluid systems reservoir or the surroundings of the system. The level value and the at least one environmental value contributing to defining the fluid systems functionality, and the monitoring system further comprises means for establishing a monitoring value on the basis of the level value and the at least one environmental value.

It is advantageous to use at least one environmental value—besides a level value—to establish a monitoring value when defining the functionality of a closed fluid circulating system, in that it hereby is possible to achieve a much more accurate description of the systems functionality.

Basing an evaluation of a fluid systems functionality on other factors than just the fluid level also provides for a more failsafe monitoring system. E.g. if a traditional oil level sensor in a wind turbine gearbox stopped functioning, it would difficult to define the fluid systems functionality. But if the description of the fluid systems functionality was also based on other measurements, such as the oil temperature and the oil flow in the gearbox lubrication system, these readings would provide a relatively good description of the systems functionality. E.g. if normal oil flow is measured and the oil temperature is not rising suspiciously there is a good chance of the system functioning well. It would therefore be relatively safe to let the wind turbine run normally, during the time it takes to repair the defective level sensor.

Furthermore, in a wind turbine, usually non of the components or systems comprising a closed fluid circulating system also includes a single high heat generating component like an internal combustion engine. When an engine is running, a fluid level measurement would usually be enough to evaluate the fluid systems functionality. The fluid systems functionality in components or systems in wind turbines are usually affected by a large number of more or less important factors, such as the ambient temperature, variations, rotational speed of rotor, flow and other.

It should be emphasised that by the term "the fluid systems functionality" is to be understood the systems ability to function properly according to its intent. This could e.g. be a lubrication systems ability to lubricate in a gearbox, or a cooling systems ability to cool a component.

In an aspect of the invention, said means for establishing a level value of said fluid systems reservoir is a device for measuring the amount of fluid in said reservoir.

E.g. when using a floater to detect the fluid level in a reservoir only an indication of the amount of fluid in the reservoir is given. The floater only detects the level of the surface of the fluid, but this level could be dependent of the fluids viscosity and on how much air is suspended in the fluid. Basing a level value on a measurement of the amount of fluid in the systems reservoir is therefore advantageous, in that in that it exclude the above mentioned possible errors in the reading, hereby making the measurement more correct and reliable.

In an aspect of the invention, said device for measuring the amount of fluid in said reservoir is a pressure transmitter.

Using a pressure transmitter for measuring the amount of fluid in the reservoir is advantageous, in that it is a simple and relatively inexpensive way of measuring the amount of fluid relatively accurately.

Furthermore, a pressure transmitter e.g. placed at the bottom of the reservoir, can measure the amount of fluid in the reservoir relatively accurate no matter if air is mixed into the fluid and no matter the viscosity of the fluid.

In an aspect of the invention, said pressure transmitter is placed below the fluid surface in said reservoir.

It is advantageous to place the pressure transmitter in the fluid in the reservoir, in that it enables the pressure transmitter to produce relatively accurate level values.

In an aspect of the invention, said means for establishing at least one environmental value of said fluid systems reservoir or the surroundings of said system are one or more temperature sensors, one or more vibrations sensors, one or more flow sensors, one or more rotation sensors, one or more equipment state detectors, a clock or any combination thereof.

Using the above mentioned sensors, detectors and clock for establishing at least one environmental value is advantageous, in that each of these or a combination of these "devices" can provide important and useful information which can contribute to establishing a more accurate assessment of the fluid systems functionality.

Furthermore several of the above mentioned sensors, detectors and clock are already present or can easily be installed in large modern wind turbines, making the provided information very inexpensive.

In an aspect of the invention, said temperature sensors measure the temperature of said fluid and/or said fluids surroundings, e.g. the temperature inside the nacelle or the ambient temperature outside the nacelle, said vibrations sensors detect vibrations and/or measure the size or frequency of vibrations of the tower, the blades and/or other components on or inside said wind turbine, said flow sensors detect flow and/or measure the size of the flow in said closed fluid circulating system or other related fluid circulating systems, said rotation sensors detect rotation and/or measure the rotation speed of the wind turbine rotor and/or other rotating wind turbine components such as the gearbox or generator, said equipment state detectors detect if said wind turbine is generating electric power, if said wind turbine is running idle, if said wind turbine is stopped, if said at least one wind turbine component is on, off or running idle or if equipment used in relation with said fluid, is operating e.g. if a ventilator fan for cooling said fluid is on or off, and said clock provides the time and date.

Measuring the temperature of the fluid and/or the fluids surroundings is advantageous, in that these temperature measurements provide important information on the fluid systems functionality. E.g. in a lubrication system the oil temperature has to be within a certain limit for the oil to function properly. If the oil becomes to hot the oil can loose its lubricating effect due to the oil disintegrating or due to too low viscosity making the oil film between the moving part too thin to function properly. If the oil becomes to cold the oils viscosity becomes too high making the oil too thick to reach areas in the system that are difficult to access.

Detecting vibrations and/or measuring the size or frequency of vibrations of the tower, the blades and/or other components on or inside the wind turbine is advantageous, in that it can provide useful information about the quality of a level value measurement.

If the tower or to some degree if the blades vibrate, the fluid in the fluid system will also vibrate or lap, making it difficult to produce an accurate level value no matter how this is done. When knowing how much the fluid splashes the level value can adjusted accordingly, hereby producing a more reliable monitoring value.

Detecting flow and/or measuring the size of the flow in the closed fluid circulating system or other related fluid circulating systems—such as a cooling system for a closed lubrication system—is advantageous, in that proper flow of fluids in a fluid circulating system of cause is important for the system to function properly.

Furthermore, a flow reading can also minimize the consequences of a malfunctioning level reader. If the sensor measuring the fluid level stops functioning, it is still relatively safe to conclude that the system functions properly as long as the fluid flows in the system, hereby providing time to make the necessary repairs without shutting down the wind turbine as a safety precaution.

Detecting rotation and/or measuring the rotation speed of the wind turbine rotor and/or other rotating wind turbine components is advantageous, in that this information in relation with the level value can provide a reliable monitoring value. E.g. when the rotor rotates, the gears in the gearbox also rotate and this will stir up the oil, making the level value itself more unreliable. But when knowing how fast the gears churn through the oil, the oil level reading can be adjusted accordingly to produce a more reliable monitoring value.

Detecting the production state of the wind turbine, the wind turbine components or related equipment is advantageous, in that this provides inexpensive information, which when used in relation with a level value can produce a more correct and reliable monitoring value.

Providing a clock to keep track of time and date also indirectly provides information about the weather e.g. wind speed, temperature etc. This is advantageous, in that the indirect information about the weather makes it possible to adjust the fluid levels critical values according to day—night and summer—winter, hereby providing a more correct and reliable monitoring value.

In an aspect of the invention, said closed fluid circulating system with a fluid reservoir is a hydraulic oil system for a wind turbine hydraulic system, a cooling fluid system of a wind turbine component cooling system and/or a lubrication system for a wind turbine component such as a gearbox.

The invention could properly be used advantageously in all fluid systems in a wind turbine, but the above mentioned system are particularly important for the running of a wind turbine and errors in any of these system would most certainly lead to a shut down of the wind turbine until the fault was repaired. It is therefore particularly advantageous to establish a monitoring value according to the invention in the above mentioned system, in that compared to the consequences of a break down of these systems, establishing a monitoring value is a relatively inexpensive way of optimizing the systems reliability.

In an aspect of the invention, said at least one wind turbine component is a gearbox, a hydraulic system and/or a cooling system.

Hereby is achieved an advantageous embodiment of the invention.

In an aspect of the invention, said fluid is oil and/or a cooling fluid.

The oil in a lubrication system or a hydraulic system can under certain conditions suspend air which is particularly damaging for a hydraulic system and if the oil becomes too cold or too hot it loses it ability to lubricate properly or its ability to flow properly in a hydraulic system. The cooling fluid in a cooling system can also under certain conditions suspend air, which can be damaging to the piping and reduce the cooling fluids heat transferring abilities. Furthermore, if the cooling fluid becomes too cold it can freeze and if it becomes too warm it will not be able to cool properly. It is therefore advantageous that the monitoring value according to the invention describes the functionality of a fluid system where the fluid is oil or a cooling fluid.

In an aspect of the invention, said means for establishing at least one environmental value is means for establishing two or more environmental values.

Basing the monitoring value on a level value and at least two environmental values is advantageous, in that using two or more environmental values will contribute to produce a more reliable and correct monitoring value.

In an aspect of the invention, said two or more environmental values is the temperature of said fluid and the rotational speed of a rotating wind turbine component, such as the rotational speed of a generator rotor or the rotational speed of the input shaft of a gearbox.

Basing the monitoring value on a level value, the temperature of the fluid and the rotational speed of a rotating wind turbine component makes it possible to produce a more reliable and correct monitoring value, in that these three factors most often will be the most important factors influencing the fluid systems functionality. E.g. in a wind turbine gearbox, the oils temperature and the rotational speed of the gear are together with the oil level the most important parameters for establishing a monitoring value describing the oil lubrication systems functionality.

It should also be noticed, that since the rotating components of a wind turbine (rotor, gearbox, generator etc.) is linked, determining the rotational speed of one of these components also provides exact information on the rotational speed of the other components, making it less important on which component the rotational speed is measured. In other words, if the rotational speed of the gears in the gearbox is needed to establish a monitoring value for the gearbox, the rotational speed of the generator or the rotor can just as well be used.

In an aspect of the invention, said means for establishing a monitoring value is a control unit.

Hereby is achieved an advantageous embodiment of the invention.

In an aspect of the invention, said control unit comprise means for storing at least two limit values for establishing said monitoring value.

Storing at least two limit values in the control unit is advantageous, in that it is hereby possible to continuously compare the possibly filtered and possibly adjusted level value to the limit values.

In an aspect of the invention, said control unit comprises means for adjusting said level value on the basis of said at least one environmental value.

Adjusting the level value on the basis of at least one environmental value is advantageous, in that a more reliable and correct level value hereby is achieved.

In an aspect of the invention, said control unit comprises means for adjusting said limit values on the basis of said at least one environmental value.

Adjusting the limit values on the basis of at least one environmental value is advantageous, in that it hereby is possible to produce a more reliable and correct monitoring value.

In an aspect of the invention, said means for making said adjustment comprise look-up tables.

Using look-up tables to make the adjustments is advantageous, in that look-up tables provides for a fast, well proven and reliable way of comparing or converting inputs, such as sensor inputs, to achieve useable adjustment values.

In an aspect of the invention, said control unit comprise means for filtering said level value and/or said at least one environmental value to remove undesired short-term fluctuations.

Filtering the values to remove short-term fluctuations is advantageous, in that the values becomes more correct and reliable, whereby it is possible to establish a more correct and reliable monitoring value.

The invention further relates to a method for monitoring at least one wind turbine component including a closed fluid circulating system with a fluid reservoir. The method comprises the steps of establishing a level value of said fluid systems reservoir, establishing at least one environmental value of said fluid systems reservoir or the surroundings of said system, and establishing a monitoring value on the basis of said level value and said at least one environmental value.

Using a method that involves other factors, that just the fluid level, to establish a monitoring value, describing the fluid systems functionality, is advantageous, in that it hereby is possible to produced a more reliable and correct monitoring value.

In an aspect of the invention, said level value is adjusted according to said at least one environmental value before said monitoring value is established.

Adjusting the level value according to the environmental values is advantageous, in that it the level value hereby becomes more correct making it possible to establish a more reliable and correct monitoring value.

In an aspect of the invention, said monitoring value is established by comparing said adjusted level value to predefined limit values.

Comparing the adjusted level value to predefined limit values is advantageous, in that the adjusted level value describes the fluid systems functionality more correctly, and hereby it is possible to achieve a more useful comparison.

In an aspect of the invention, said monitoring value triggers an alarm procedure if said adjusted level value is outside said predefined limit values.

Making the monitoring value trigger an alarm procedure, such as shutting down the wind turbine or sending an alarm to some sort of external surveillance system, is advantageous, in that it hereby is possible to refill or repair the fluid system, before the lack or excess of fluid in the system will damage the wind turbine component or in other ways cause damage.

In an aspect of the invention, said monitoring value is established by comparing said level value to limit values which have been adjusted according to said at least one environmental value.

Adjusting the limit values according to environmental values is advantageous, in that the limit values becomes more correct hereby reducing the risk of "false alarm" e.g. shutting down the wind turbine on the basis of a level value compared to fixed limit values, which e.g. are determined on the basis of data on an average wind turbine.

In an aspect of the invention, said monitoring value triggers an alarm procedure if said level value is outside said adjusted limit values.

In an aspect of the invention, said monitoring value is established by comparing said adjusted level value to limit values, which have been adjusted according to at least one further environmental value.

Adjusting the level value according to one or more environmental values and adjusting the limit values according to one or more further environmental values is advantageous, in that it hereby is possible to establish a more reliable and correct monitoring value.

In an aspect of the invention, said monitoring value triggers an alarm procedure if said adjusted level value is outside said adjusted limit values.

In an aspect of the invention, said monitoring value is established on the basis of said level value and at least two environmental values.

Basing the monitoring value on a level value and at least two environmental values is advantageous, in that using two or more environmental values will contribute to produce a more reliable and correct monitoring value.

In an aspect of the invention, said level value and/or said at least one environmental value are filtered to remove undesired short-term fluctuations before said monitoring value is established.

The invention also relates to a system for monitoring a mechanical and/or electrical component including a closed fluid circulating system with a fluid reservoir. The monitoring system comprises, means for establishing a level value of the fluid systems reservoir, and means for establishing at least one environmental value of the fluid systems reservoir or the surroundings of the system. The level value and the at least one environmental value contributing to defining the fluid systems functionality, and the monitoring system further comprises means for establishing a monitoring value on the basis of the level value and the at least one environmental value.

Basing the monitoring value on other factors—besides just the fluid level—is advantageous, in that it hereby is possible to describe the fluid systems functionality more correct, making the monitoring value more reliable.

In an aspect of the invention, said means for establishing a level value of said fluid systems reservoir is a device for measuring the amount of fluid in said reservoir.

In an aspect of the invention, said device for measuring the amount of fluid in said reservoir is a pressure transmitter.

In an aspect of the invention, said pressure transmitter is placed below the fluid surface in said reservoir.

In an aspect of the invention, said means for establishing at least one environmental value of said fluid systems reservoir or the surroundings of said system are one or more temperature sensors, one or more vibrations sensors, one or more flow sensors, one or more rotation sensors, one or more equipment state detectors, a clock or any combination thereof.

In an aspect of the invention, said temperature sensors measure the temperature of said fluid and/or said fluids surroundings, said vibrations sensors detect vibrations and/or measures the size or frequency of vibrations of said component through which said fluid circulates and/or other related components, said flow sensors detect flow and/or measures the size of the flow in said closed fluid circulating system or other related fluid circulating systems, said rotation sensors detect rotation and/or measures the rotation speed of rotating parts in said component, such as the rotation of the input shaft of a gearbox or the rotation of the rotor in a generator, said equipment state detectors detect if said component operating, if said component is running idle, if said component is stopped or if equipment used in relation with said fluid, is operating e.g. if a ventilator fan for cooling said fluid is on or off, and said clock provides the time and date.

In an aspect of the invention, said closed fluid circulating system with a fluid reservoir is a hydraulic oil system, a cooling fluid system of a cooling system and/or a lubrication system for a component such as a gearbox.

In an aspect of the invention, said means for establishing at least one environmental value is means for establishing two or more environmental values.

In an aspect of the invention, said means for establishing a monitoring value is a control unit.

In an aspect of the invention, said control unit comprise means for storing at least two limit values for establishing said monitoring value.

In an aspect of the invention, said control unit comprises means for adjusting said level value on the basis of said at least one environmental value.

In an aspect of the invention, said control unit comprises means for adjusting said limit values on the basis of said at least one environmental value.

In an aspect of the invention, said means for making said adjustment comprise look-up tables.

In an aspect of the invention, said control unit comprise means for filtering said level value and/or said at least one environmental value for short-term fluctuations.

BRIEF DESCRIPTION OF THE DRAWINGS

The invention will be described in the following with reference to the figures in which.

DETAILED DESCRIPTION OF THE INVENTION

Figure 1:
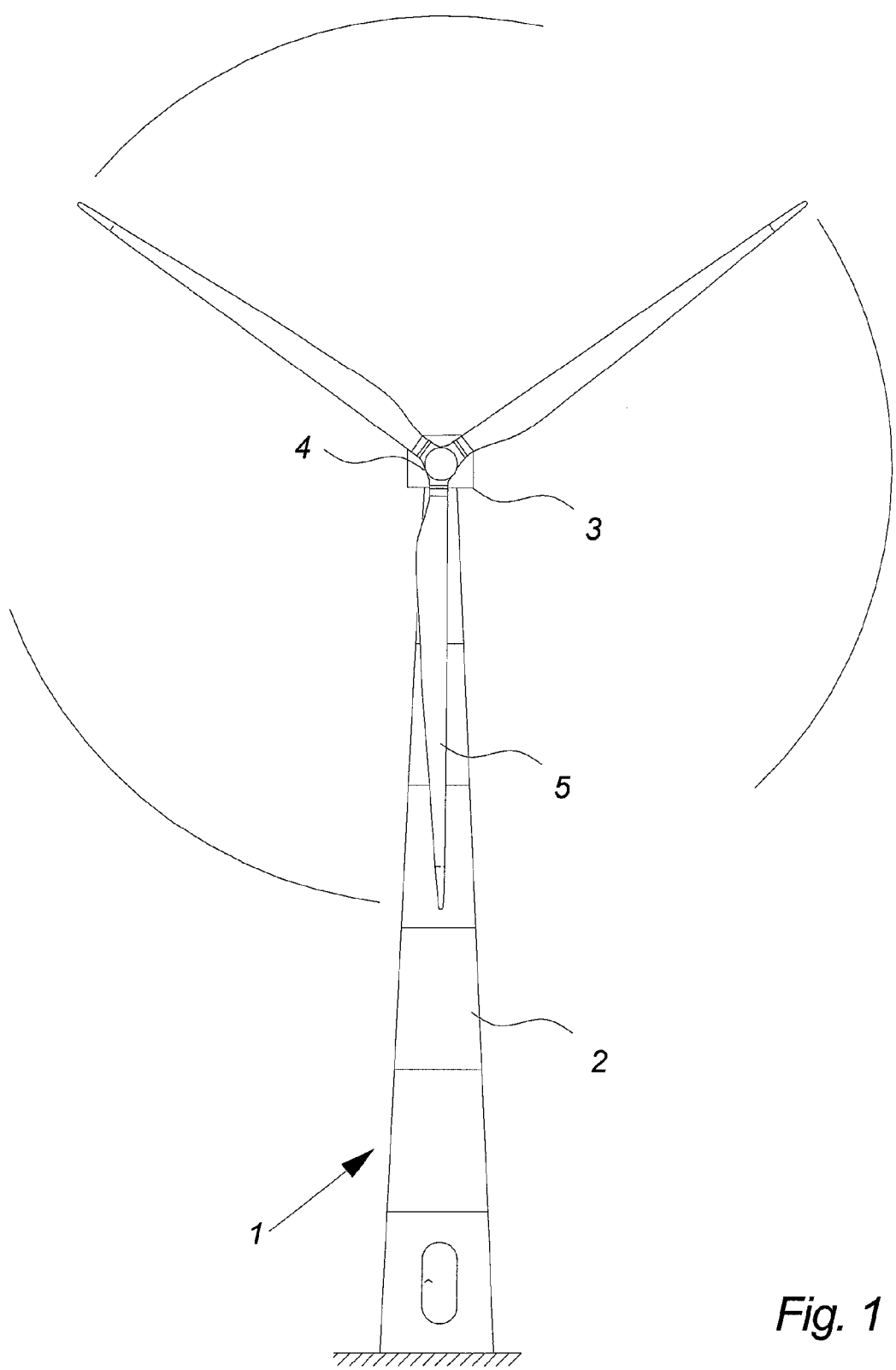
FIG. 1 illustrates a large modern wind turbine known in the art, as seen from the front.

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
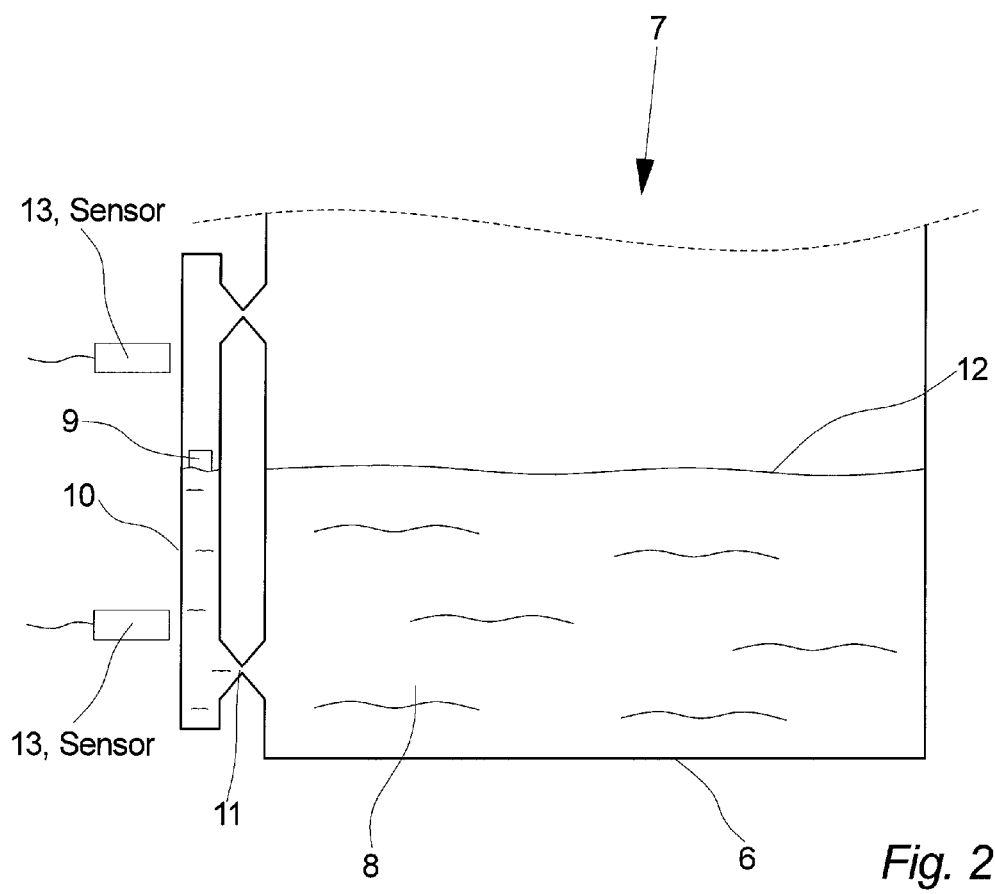
FIG. 2 illustrates a reservoir of a traditional closed fluid circulating system, as seen from the side.

FIG. 2 illustrates a reservoir 6 of a traditional closed fluid circulating system 7 as seen from the side.

The illustrated reservoir 6 could e.g. be the oil sump of a gearbox, the oil tank of a hydraulic system, or a cooling fluid reservoir of a cooling system. The fluid 8 which do not circulate in the system 7 is more or less temporally retained in the reservoir 6. The reservoir 6 is therefore the most obvious place to measure the amount of fluid in the system 7.

Traditionally this is done by establishing a floater 9 in one or more vessels 10, connected to the reservoir 6 through flow restrictions in form of two nozzles 11 placed well above and below the normal fluid level. When the floater 9 reaches a top or a bottom level the floater 9 is registered by a touch-less level sensor 13 or an electrical switch (not shown), which is connected to e.g. a control board. The control board would then start an alarm procedure if a high or a low level was registered.

The nozzles 11, through which the levels 12 communicate, have relatively small holes through which the fluid flows. By this, any short-term fluctuations in the fluid level 12 in the reservoir 6 will be "filtered" out.

The sensors 13 or electrical switches which detects the floater 9 at given levels are typically fixed, meaning that the top level and the bottom level, at which the floater 9 would trigger an alarm, are the same at all times independent of all other working conditions.

Figure 3:
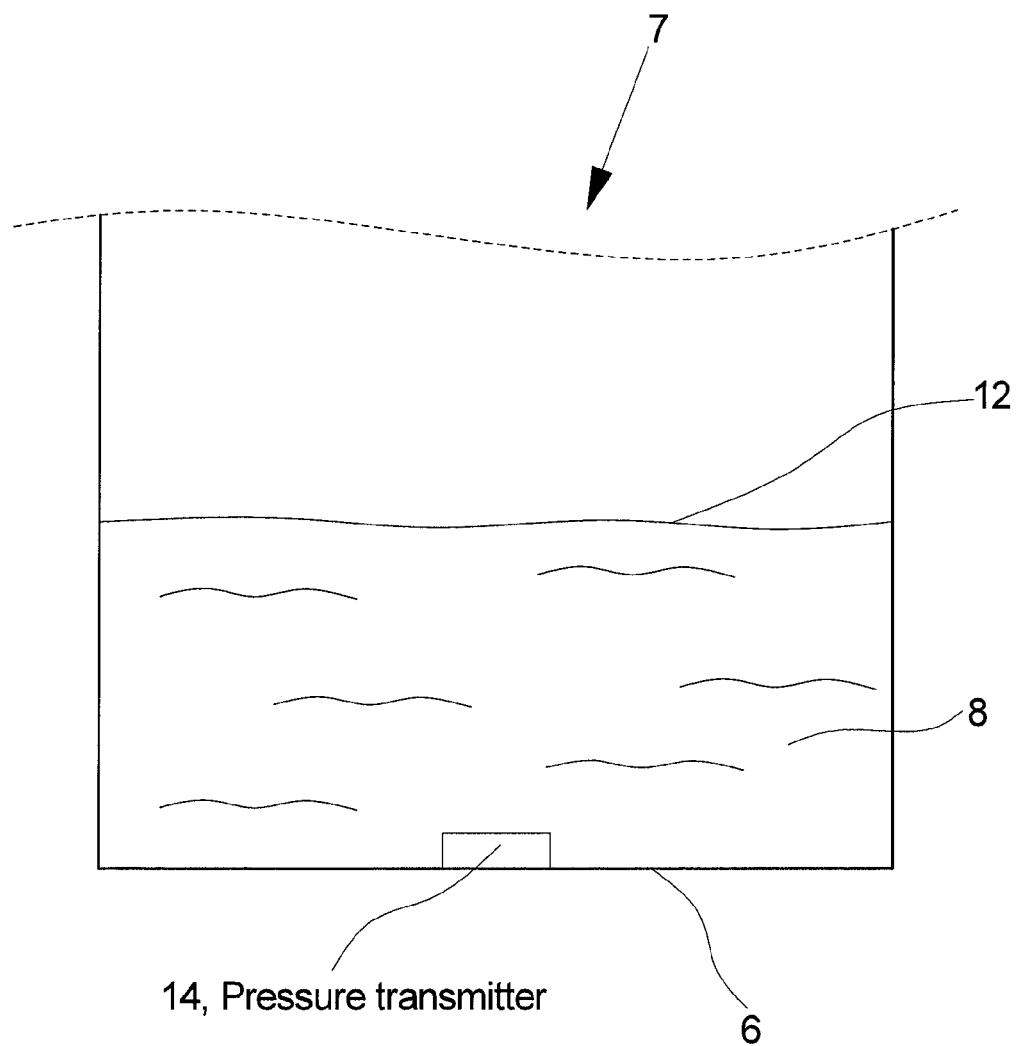
FIG. 3 illustrates a fluid reservoir comprising a pressure transmitter as seen from the side.

FIG. 3 illustrates a fluid reservoir 6 comprising a pressure transmitter 14 as seen from the side. In this embodiment of the invention the amount of fluid 8 in the reservoir 6 is measured by a pressure transmitter 14 placed under the surface of the fluid 8 in the reservoir 6. In another embodiment of the invention the pressure transmitter 14 could also be positioned on the sides of the reservoir 6, just as long as the pressure transmitter 14 always is positioned lower than a specified minimum fluid level in the reservoir 6.

The pressure transmitter 14 registers changes of the pressure on the transmitter 14, which can be translated into fluid level 12, when knowing the shape of the reservoir 6.

Figure 4:
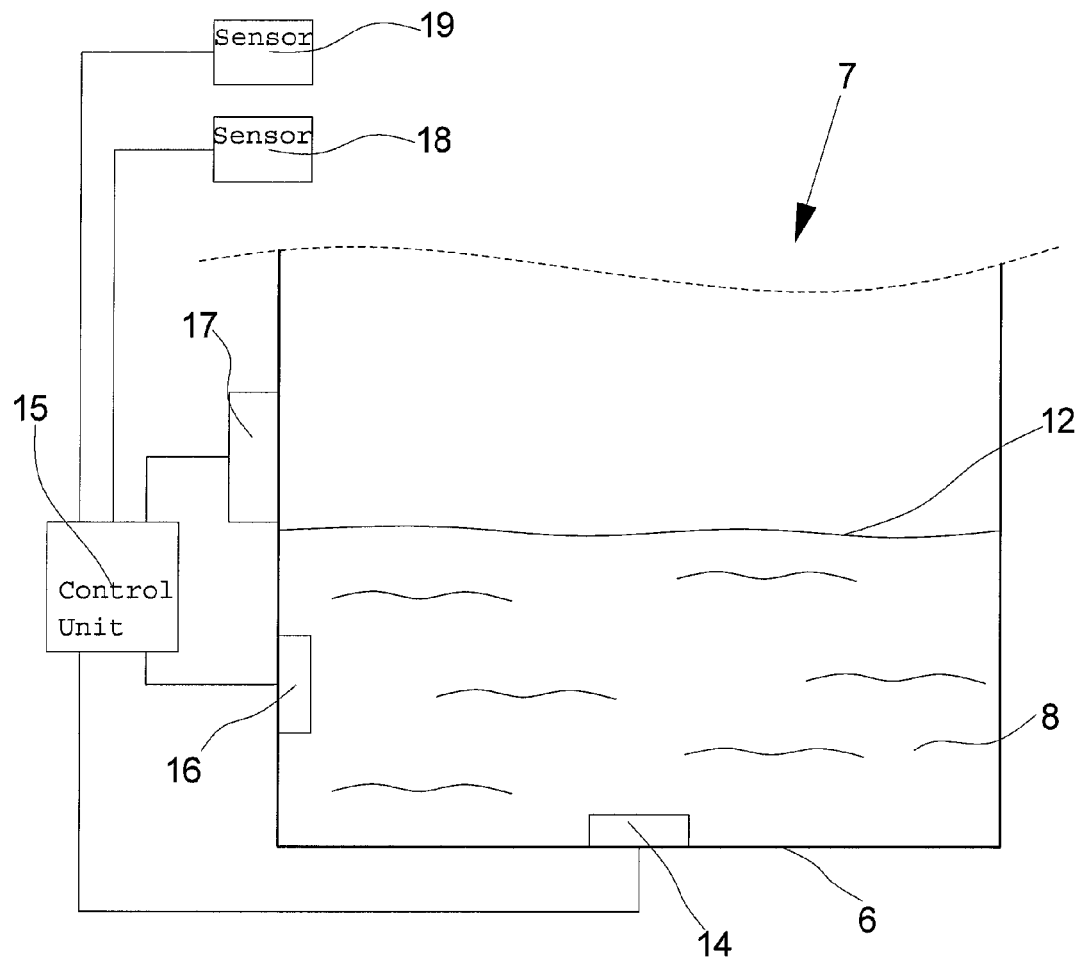
FIG. 4 illustrates a fluid reservoir, a number of sensors and a controller unit, as seen from the side.

FIG. 4 illustrates a fluid reservoir 6, a number of sensors and a controller unit 15.

In this embodiment of the invention the reservoir 6 is provided with a pressure transmitter 14 positioned under the surface of the fluid, and in this case at the bottom of the reservoir 6. Also in the fluid is placed a temperature sensor 16 for measuring the fluids temperature. In another embodiment of the invention this sensor 16 could also be placed somewhere in or on the pipes or components through which the fluid circulates.

The signal from the pressure transmitter 14 and the temperature sensor 16 are wirelessly or through signal conducting cables fed to a control unit 15. The control unit 15 can also connected to a number of other sensors.

This could e.g. be temperature sensors 28 for measuring the temperature in the wind turbine nacelle 3, the ambient temperature outside the wind turbine 1 and/or for measuring the temperature somewhere inside the component through which the fluid 8 circulates.

It could also be a vibration sensor 17 for detecting vibrations or measuring the size or frequency of the vibrations of the blades 5, the tower 2, the component through which the fluid 8 circulates or other relevant components or it could be flow sensors 18 detecting flow or measuring the size of the flow in the closed fluid circulating system 7 or in any other relevant system such as a cooling system for cooling the oil in a closed oil circulating lubrication system.

The sensor could also be rotation sensors 27 such as a tacho, an incremental or absolute encoder etc. detecting rotation and/or measuring the rotation speed of the wind turbine rotor 4, a gear shaft, any rotation part of the component through which the fluid 8 circulates and/or other wind turbine components.

The sensor could also be a equipment state detector 19 detecting if the wind turbine 1 is producing electric power, if it is running idle, if it is stopped, if the component through which the fluid 8 circulates is on, off or running idle or if equipment used in relation with said fluid, is operating e.g. if a ventilator fan for cooling said fluid is on or off.

Many of these sensors are already present in large modern wind turbines 1, such as several temperature 16, 28, vibration 17, flow 18 and rotation speed sensors 27. And detecting the state of the wind turbine 1 or its different components is also information already present or at least very easily available.

In another embodiment of the invention other kinds of sensors are also feasible e.g. sensors deployed specifically and only for providing the control unit 15 with information.

The control unit could be provided with one or more alarm values, making the—possibly processed—sensors signals trigger an alarm procedure. These alarm limit parameters could be stored in the control unit and they could be changed depending on the equipment in which the fluid system 7 is deployed, e.g. depending on the make of different wind turbine gearboxes.

Figure 5:
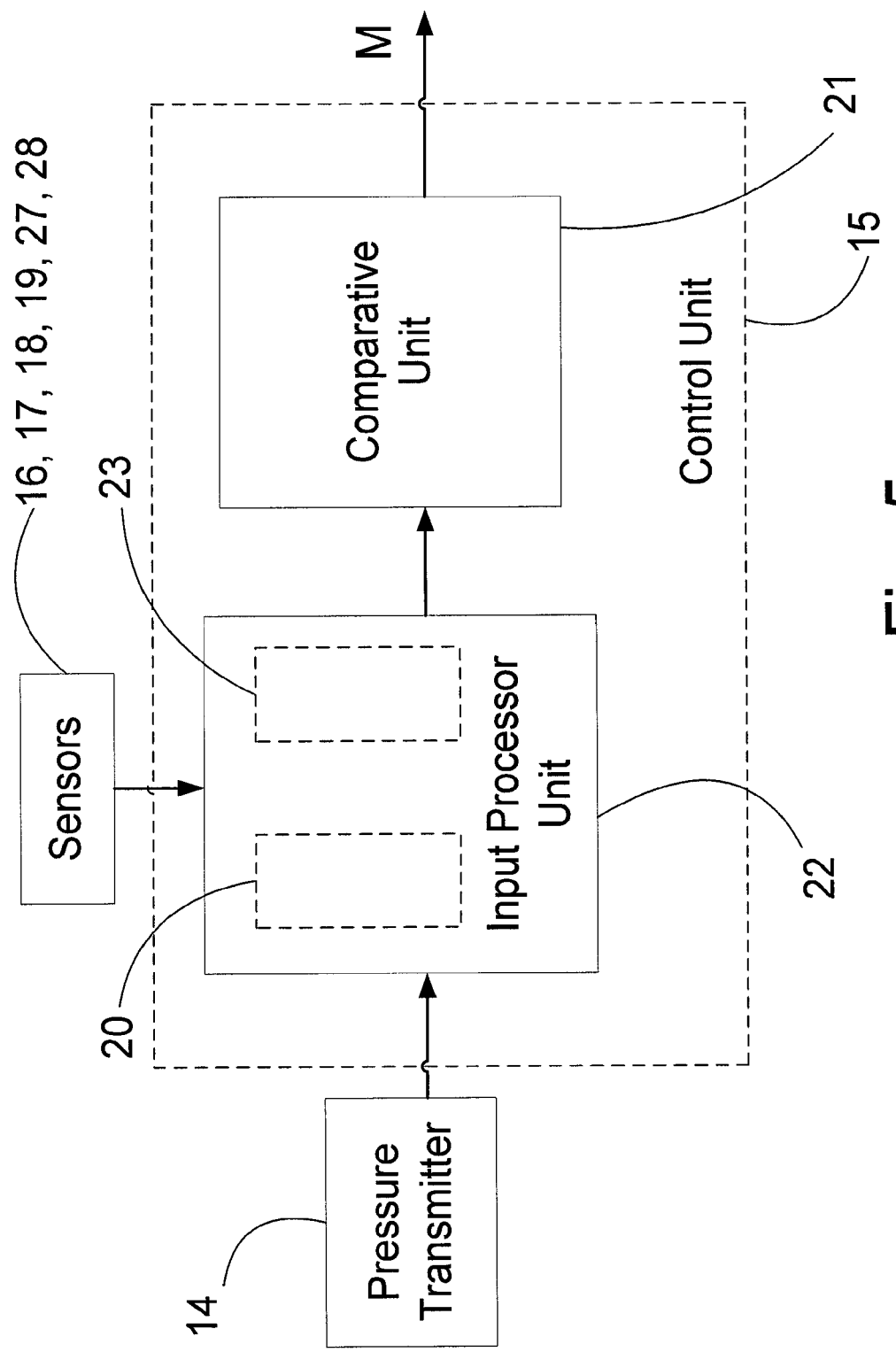
FIG. 5 illustrates an embodiment of a control unit.

FIG. 5 shows a schematic illustration of an embodiment of a control unit 15. In this embodiment of the invention the level value from a pressure transmitter 14 is fed to a control unit 15 or in this embodiment more precisely an input processor unit 22 of a control unit 15. The pressure transmitter 14 signal is first filtered in the filter 20 to remove any short-term fluctuations. This could e.g. be done by making an average value over the last ten seconds measurements, where the pressure transmitter actually measures the level every one second. In another embodiment of the invention the pressure transmitters 14 level value could be filtered before it arrived at the control unit 15.

In a processor 23 the filtered level value is corrected according to one or more environmental values fed to the input processor unit 22 from one or more sensors 16, 17, 18, 19, 27, 28. If needed, this or these environmental values could also be filtered to remove undesired fluctuations or other, either in or before the control unit 15.

A monitoring value M is established by feeding the filtered and corrected level value to a comparative unit 21 where the filtered and corrected value is compared to limit values in form of maximum and minimum values. E.g. an alarm procedure could then be started on the basis of this monitoring value M.

The limit values could be predetermined, they could be adjustable according to certain factors or they could be provided through an interface.

An example of how this could be put into practice is that a level value from a pressure transmitter 14, placed in the oil reservoir 6 of a lubrication system in a wind turbine gearbox, is feed to a control, which could be a PLC (Programmable Logic Controller).

This signal indicating the amount of oil in the reservoir 6, does not in itself fully describe the functionality of the lubrication system. E.g. if gears are churning through the oil in the reservoir 6, a significant amount of oil would cling to the gears and be splattered onto the inside of gearbox walls, making an adequate oil level in the reservoir depend on the rotational speed of the gears. Information about the rotational speed of the gear, the wind turbine rotor 4, the generator or other linked rotating components are usually already feed to the control of a modern wind turbine 1, so with basis in this environmental value (the rotational speed of the gears) the level value could be adjusted to more precisely describe the lubrication systems functionality.

But the level value can be further refined. The amount of oil stuck to the gears and walls does also depend of the oils temperature. The oils viscosity change with its temperature, making it thinner the hotter it is. The temperature of the oil could therefore be measured and this second environmental value could be fed to the control and used to further adjust the oil level value.

Further environmental values could be measured specifically for the purpose of adjusting the level value and/or other existing measurements, and/or other combinations could be used to adjust the level value, making it describe the lubrication systems functionality as well as it is required or as well as it is possible.

Finally the filtered and adjusted level value is compared to predefined limit values to produce a monitoring value. This monitoring value could be an on-off signal e.g. keeping an output of the PLC high (providing an electrical potential to an output socket) as long as the level value is inside the limit, and removing the signal if the monitoring value is outside the limit values.

The monitoring value could also be graduated into a specific signal, if the level value is within a "safe" limit, another signal if the level value is "suspiciously" low or high and a third signal if the level value is "critically" low or high.

Depending on the signal the monitoring value could trigger an alarm procedure. E.g. if a monitoring value was produced which indicated that the oil level was low, a signal could be send to some sort of external surveillance, providing time to refill the lubricant system before the oil level gets critically low.

Likewise, if the monitoring value was within the "critically" limits a complete shutdown of the wind turbine 1 could be commenced to protect the gearbox from any major damage.

Figure 6:
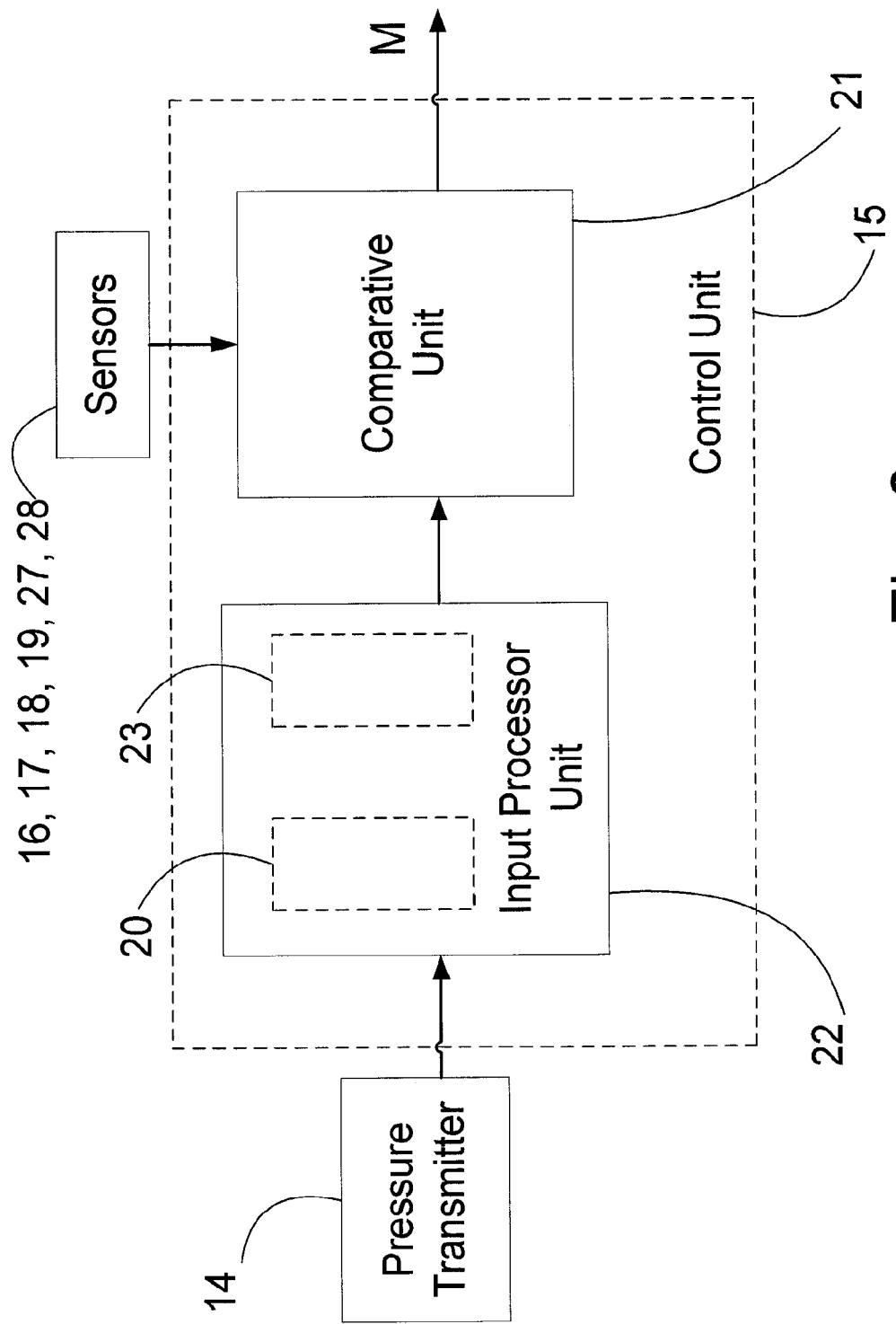
FIG. 6 illustrates another embodiment of a control unit.

FIG. 6 illustrates a schematic illustration of another embodiment of a control unit 15.

As shown in FIG. 5 the level value from a pressure transmitter 14 is fed to input processor unit 22 of a control unit 15. The pressure transmitter 14 signal is first filtered in the filter 20 to remove any short-term fluctuations or if the level value is pre-filtered it could pass unchanged through the input processor unit 22 or the control unit 15 would not comprise an input processor unit 22 in this embodiment of the invention.

The filtered level value is then fed to a comparative unit 21 where the level value is compared to one or more limit values to produce a monitoring value.

In this embodiment of the invention these limit values are adjusted on the basis of input from one or more sensors 16, 17, 18, 19, 27, 28. This means that e.g. if the gears of a gearbox was rotating at maximum speed the oil level in the gearbox reservoir 6 could be significantly lower than if the gearbox was rotating at slow speed. The lowest oil level at which an alarm or the like should be triggered could therefore be adjusted downwards as the rotational speed increases.

Figure 7:
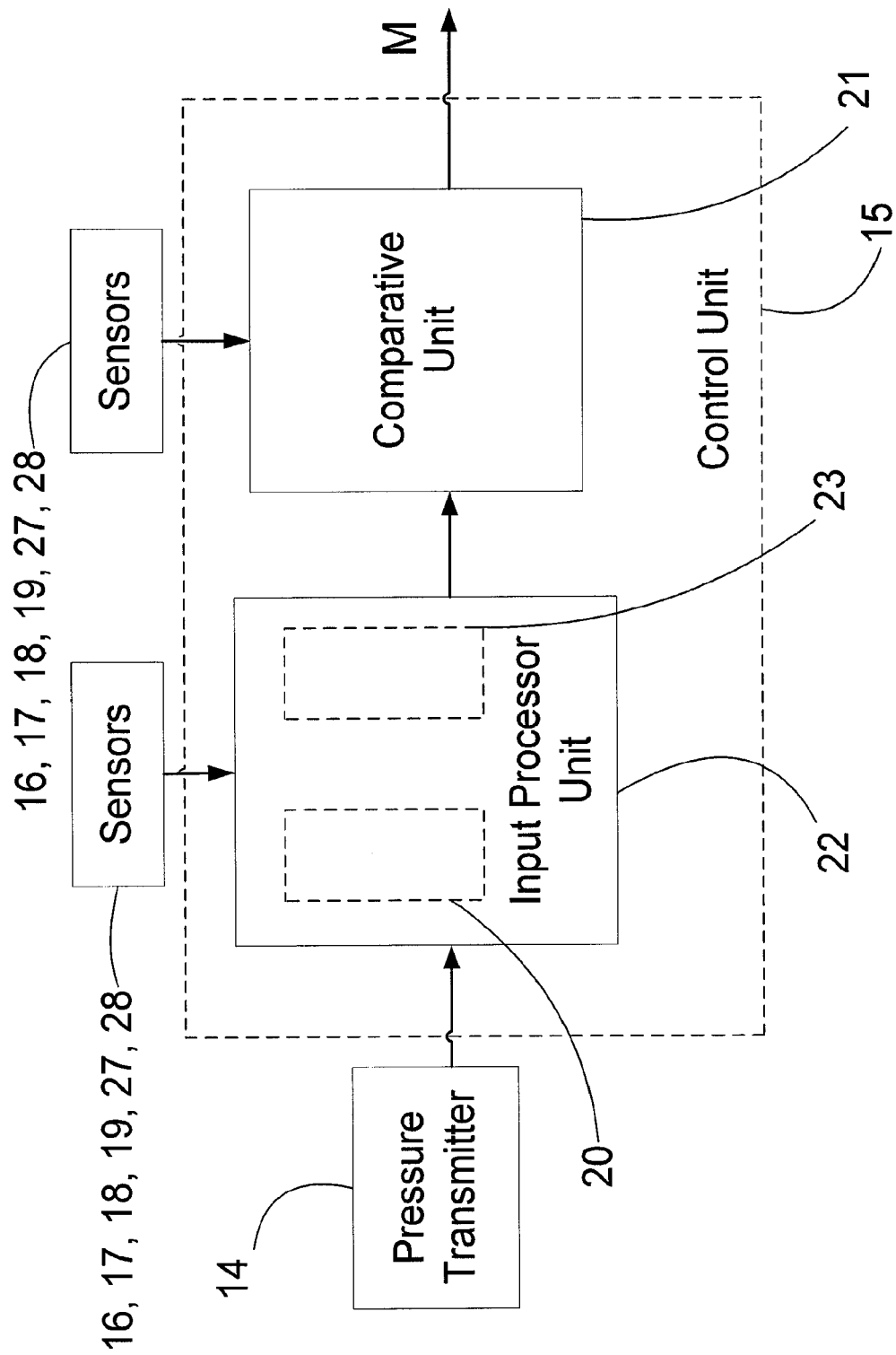
FIG. 7 illustrates a third embodiment of a control unit.

FIG. 7 illustrates a schematic illustration of a third embodiment of a control unit 15. This embodiment is in principle a combination of the embodiments illustrated in FIGS. 5 and 6.

In this embodiment some of the environmental values are used for adjusting the level value before the level value is compared to the limits in the comparative unit 21. Other environmental values are then used for adjusting the limit values in the comparative unit 21.

Figure 8:
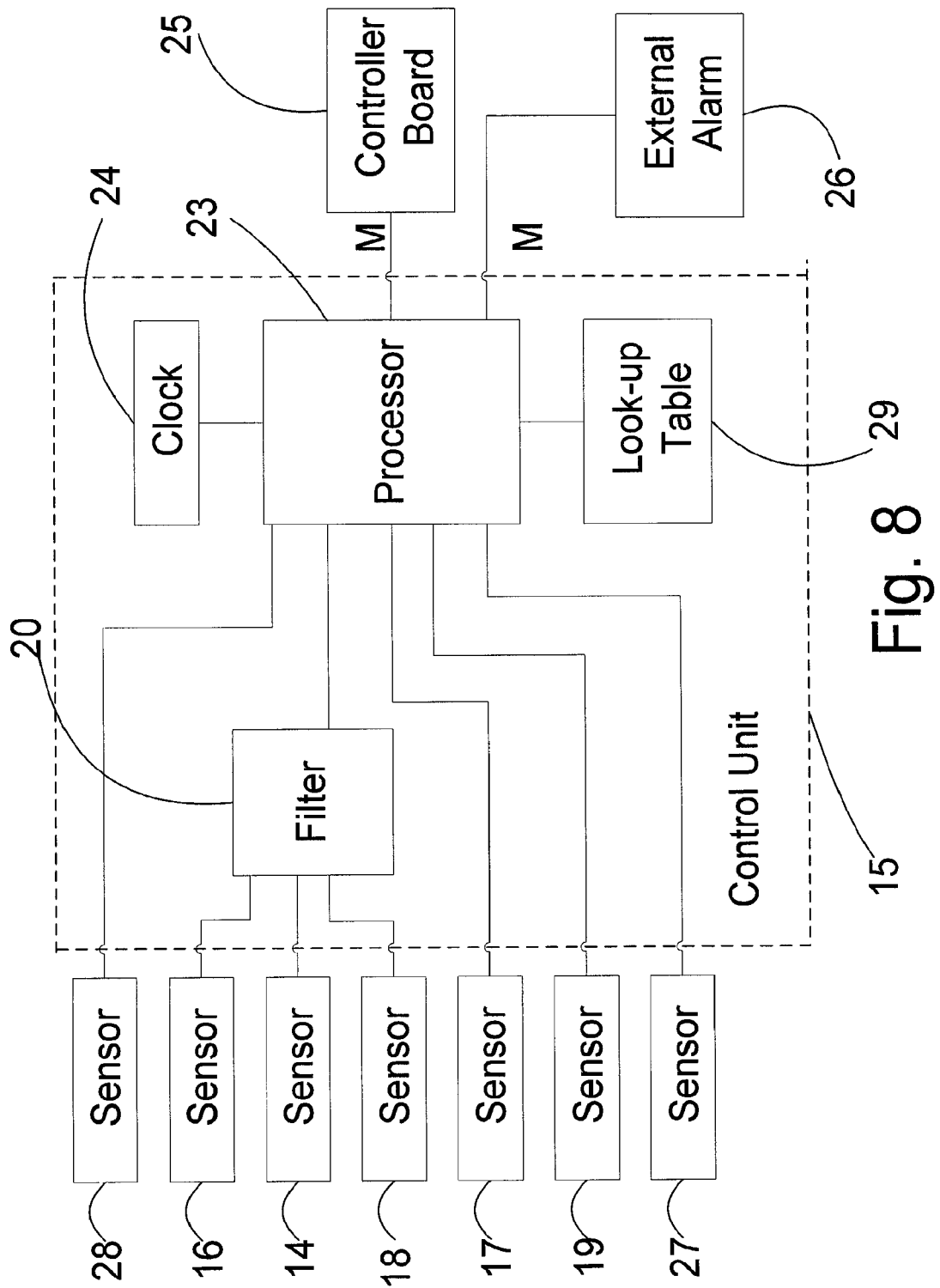
FIG. 8 illustrates a fourth embodiment of a control unit.

FIG. 8 illustrates a fourth embodiment of a control unit 15. In this embodiment of the invention the control unit 15 comprise a number of functions such as a filter 20, a look-up table 29, a clock 24 and a processor 23 but in another embodiment the control unit could also comprise other functions or some of the shown functions could be removed. Furthermore, in this embodiment of the invention the control unit 15 is shown as an individual part separate from the rest of the wind turbine 1 control system but in a preferred embodiment of the invention the control unit 15 would be an integrated part of the ordinary wind turbine 1 control system such as a PLC or a PC control.

In this embodiment of the invention a number of sensors are connected to the control unit 15.

A temperature sensor 28 measuring the temperature inside a wind turbine nacelle 3 is connected to the processor 23 in the controller unit 15, and another temperature sensor 16, measuring the temperature of the fluid, is connected to the filter to filter out short-term fluctuations e.g. originating from oil splashes hitting a sensor 16 placed above the oil level in a gearbox reservoir 6.

A pressure transmitter 14 is connected to the filter 20 in the control unit 15 to filter out any short-term fluctuations in the fluid amount reading before the signal are fed to the processor 23.

A flow sensor 18 measuring the size of the oil flow in the lubrication system of a gearbox is connected to a filter 20 to smooth out any major short-term variations in the signal e.g. origination from air bubbles in the fluid system.

A vibration sensor 17 detecting vibrations in the tower 2 is connected to the processor 23 in the controller unit 15.

An equipment state detector 19 is in this case simply a cable connected to the a output signal of a PLC (Programmable Logic Controller), which sends an electrical current if the wind turbine is producing electrical power and does not if the wind turbine 1 is idling or stopped. This wind turbine state signal is fed to the processor 23 in the control unit 15.

A rotation sensor 27 measuring the rotation speed of the input shaft of a gearbox is connected to the processor 23.

In another embodiment of the invention other sensors, another number of sensors or another combination of sensors connected differently would be possible.

The signals from the sensors 14, 16, 17, 18, 19, 27, 28 are fed to the processor 23 which could also be connected to a clock 24 and a look-up table 29.

The clock 24 could provide the processor 23 with information on the time of year and the time of day. This information could e.g. be used if a wind turbine 1 was placed in an environment with much wind in the summer and low wind in the winter. When knowing the time of year the processor 23 could operate with different alarm levels on different times of year.

The processor 23 could use the look-up table 29 to convert specific sensor readings to specific alarm limits, or it could adjust the level value a specific amount when looking up with a specific sensor measurement in the look-up table 29.

The processor 23 could also refer to the look-up table 29 for information on the alarm limits at specific sensor inputs. These alarm limits could then be empirical values found by measuring the fluid pressure under different conditions, e.g. at different rotation speeds and different fluid temperatures. These alarm limit parameters would then depend on the specific equipment in which the fluid circulating system 7 is used, e.g. the look-up table 29 would have to be provided with different sets of alarm limits for fluid systems 7 in different types of gearboxes.

In another embodiment of the invention the alarm limits could be adjusted according to the sensor inputs. How and how much the alarm limits is adjusted could then e.g. be based on a set of empiric correction values, which the processor 23 could find in the look-up table 29.

All the data from the sensors and/or the clock is processed in the processor 23 to produce a monitoring value M. The monitoring value M describes the fluid systems 7 functionality more precisely than a level reading alone would do.

The information that the monitoring value M provides could then be fed to the main control board 25 in the wind turbine, to an external alarm system 26 or to other systems.

The invention has been exemplified above with reference to specific examples of closed fluid circulating systems 7, control units 15, sensors 14, 16, 17, 18, 19, 27, 28 and methods of using them. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Fluid reservoir
7. Closed fluid circulating system
8. Fluid
9. Floater
10. Vessel
11. Nozzle
12. Fluid level
13. Level sensor
14. Pressure transmitter
15. Control unit
16. Fluid temperature sensor
17. Vibration sensor
18. Flow sensor
19. Equipment state sensor
20. Filter
21. Comparative unit
22. Input processor unit
23. Processor
24. Clock
25. Controller board
26. External alarm
27. Rotation sensor
28. Ambient temperature sensor
29. Look-up table
M. Monitoring value

What is claimed is:

1. A wind turbine comprising a system for monitoring at least one wind turbine component including a closed fluid circulating system with a fluid reservoir, said monitoring system comprising,
    means for establishing a level value of said fluid systems reservoir, and
    means for establishing at least one environmental value of said fluid systems reservoir or the surroundings of said system,
    said level value and said at least one environmental value contributing to defining said fluid systems functionality, and
    means for establishing a monitoring value on the basis of said level value and said at least one environmental value.

2. The wind turbine according to claim 1, wherein said means for establishing a level value of said fluid systems reservoir is a device for measuring the amount of fluid in said reservoir.

3. The wind turbine according to claim 2, wherein said device for measuring the amount of fluid in said reservoir is a pressure transmitter.

4. The wind turbine according to claim 3, wherein said pressure transmitter is placed below the fluid surface in said reservoir.

5. The wind turbine according to claim 1, wherein said means for establishing at least one environmental value of said fluid systems reservoir or the surroundings of said system are one or more temperature sensors, one or more vibrations sensors, one or more flow sensors, one or more rotation sensors, one or more equipment state detectors, a clock or any combination thereof.

6. The wind turbine according to claim 5, wherein
    said temperature sensors measure the temperature of said fluid and/or said fluids surroundings,
    said vibrations sensors detect vibrations and/or measures the size or frequency of vibrations of the tower, the blades and/or other components on or inside said wind turbine,
    said flow sensors detect flow and/or measures the size of the flow in said closed fluid circulating system or other related fluid circulating systems,
    said rotation sensors detect rotation and/or measures the rotation speed of the wind turbine rotor and/or other rotating wind turbine components such as the gearbox or generator,
    said equipment state detectors detect if said wind turbine is generating electric power, if said wind turbine is running idle, if said wind turbine is stopped, if said at least one wind turbine component is on, off or running idle or if equipment used in relation with said fluid, is operating, and
    said clock provides the time and date.

7. The wind turbine according to claim 1, wherein said closed fluid circulating system with a fluid reservoir is a hydraulic oil system for a wind turbine hydraulic system, a cooling fluid system of a wind turbine component cooling system and/or a lubrication system for a wind turbine component such as a gearbox.

8. The wind turbine according to claim 1, wherein said at least one wind turbine component is a gearbox, a hydraulic system and/or a cooling system.

9. The wind turbine according to claim 1, wherein said fluid is oil or a cooling fluid.

10. The wind turbine according to claim 1, wherein said means for establishing at least one environmental value is means for establishing two or more environmental values.

11. The wind turbine according to claim 10, wherein said two or more environmental values is the temperature of said fluid and the rotational speed of a rotating wind turbine component.

12. The wind turbine according to claim 1, wherein said means for establishing a monitoring value is a control unit.

13. The wind turbine according to claim 12, wherein said control unit comprise means for filtering said level value and/or said at least one environmental value to remove undesired short-term fluctuations.

14. The wind turbine according to claim 12, wherein said control unit comprise means for storing at least two limit values for establishing said monitoring value.

15. The wind turbine according to claim 12, wherein said control unit comprises means for adjusting said level value on the basis of said at least one environmental value.

16. The wind turbine according to claim 12, wherein said control unit comprises means for adjusting said limit values on the basis of said at least one environmental value.

17. The wind turbine according to claim 16, wherein said means for making said adjustment comprise look-up tables.

18. Method for monitoring at least one wind turbine component including a closed fluid circulating system with a fluid reservoir via a monitoring system, said method comprising the steps of,
    establishing a level value of said fluid systems reservoir via a device for measuring the amount of fluid in said reservoir,
    establishing at least one environmental value of said fluid systems reservoir or the surroundings of said system via at least one of a sensor, an equipment state detector, and a clock, and establishing a monitoring value on the basis of said level value and said at least one environmental value via a control unit.

19. Method according to claim 18, wherein said level value is adjusted via means for making adjustment according to said at least one environmental value before said monitoring value is established.

20. Method according to claim 19, wherein said monitoring value is established by comparing said adjusted level value to limit values, which have been adjusted according to at least one further environmental value.

21. Method according to claim 20, wherein said monitoring value triggers an alarm procedure if said adjusted level value is outside said adjusted limit values.

22. Method according to claim 19, wherein said monitoring value is established by comparing said adjusted level value to predefined limit values.

23. Method according to claim 22, wherein said monitoring value triggers an alarm procedure if said adjusted level value is outside said predefined limit values.

24. Method according to claim 18, wherein said monitoring value is established by comparing said level value to limit values which have been adjusted according to said at least one environmental value.

25. Method according to claim 24, wherein said monitoring value triggers an alarm procedure if said level value is outside said adjusted limit values.

26. Method according to claim 18, wherein said monitoring value is established on the basis of said level value and at least two environmental values.

27. Method according to claim 18, wherein said level value and/or said at least one environmental value are filtered via a filter to remove undesired short-term fluctuations before said monitoring value is established.

28. A system for monitoring a mechanical and/or electrical component in a wind turbine including a closed fluid circulating system with a fluid reservoir, said monitoring system comprising,
    means for establishing a level value of said fluid systems reservoir, and
    means for establishing at least one environmental value of said fluid systems reservoir or the surroundings of said system,
    said level value and said at least one environmental value contributing to defining said fluid systems functionality, and
    means for establishing a monitoring value on the basis of said level value and said at least one environmental value.

29. The system according to claim 28, wherein said means for establishing a level value of said fluid systems reservoir is a device for measuring the amount of fluid in said reservoir.

30. The system according to claim 29, wherein said device for measuring the amount of fluid in said reservoir is a pressure transmitter.

31. The system according to claim 30, wherein said pressure transmitter is placed below the fluid surface in said reservoir.

32. The system according to claim 28, wherein said means for establishing at least one environmental value of said fluid systems reservoir or the surroundings of said system are one or more temperature sensors, one or more vibrations sensors, one or more flow sensors, one or more rotation sensors, one or more equipment state detectors, a clock or any combination thereof.

33. The system according to claim 32, wherein
    said temperature sensors measure the temperature of said fluid and/or said fluids surroundings,
    said vibrations sensors detect vibrations and/or measures the size or frequency of vibrations of said component through which said fluid circulates and/or other related components,
    said flow sensors detect flow and/or measures the size of the flow in said closed fluid circulating system or other related fluid circulating systems,
    said rotation sensors detect rotation and/or measures the rotation speed of rotating parts in said component, such as the rotation of the input shaft of a gearbox or the rotation of the rotor in a generator,
    said equipment state detectors detect if said component operating, if said component is running idle, if said component is stopped or if equipment used in relation with said fluid, is operating, and
    said clock provides the time and date.

34. The system according to claim 28, wherein said closed fluid circulating system with a fluid reservoir is a hydraulic oil system, a cooling fluid system of a cooling system and/or a lubrication system for a component such as a gearbox.

35. The system according to claim 28, wherein said means for establishing at least one environmental value is means for establishing two or more environmental values.

36. The system according to claim 28, wherein said means for establishing a monitoring value is a control unit.

37. The system according to claim 36, wherein said control unit comprise means for storing at least two limit values for establishing said monitoring value.

38. The system according to claim 36, wherein said control unit comprises means for adjusting said level value on the basis of said at least one environmental value.

39. The system according to claim 36, wherein said control unit comprises means for adjusting said limit values on the basis of said at least one environmental value.

40. The-system according to claim 39, wherein said means for making said adjustment comprise look-up tables.

41. The system according to claim 36, wherein said control unit comprise means for filtering said level value and/or said at least one environmental value.

* * * * *